(12) United States Patent
Araya et al.

(10) Patent No.: US 6,473,434 B1
(45) Date of Patent: Oct. 29, 2002

(54) SCALEABLE AND ROBUST SOLUTION FOR REDUCING COMPLEXITY OF RESOURCE IDENTIFIER DISTRIBUTION IN A LARGE NETWORK PROCESSOR-BASED SYSTEM

(75) Inventors: Yonas Araya, Raleigh, NC (US); Claude Basso, Raleigh, NC (US); Brahmanand Kumar Gorti, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 09/838,916

(22) Filed: Apr. 20, 2001

(51) Int. Cl.[7] .......................... H04L 12/54; G06F 13/00
(52) U.S. Cl. ...................... 370/412; 370/428; 710/39; 710/54; 710/129
(58) Field of Search .................................. 370/412, 414, 370/413, 415, 416, 417, 418, 428, 463, 419, 429, 912, 398, 395.1, 351, 386; 709/215, 216, 201, 103, 102, 106, 300; 710/39, 54, 129

(56) References Cited

U.S. PATENT DOCUMENTS

| | | |
|---|---|---|
| 5,136,718 A | 8/1992 | Haydt |
| 5,349,656 A | 9/1994 | Kaneko et al. |
| 5,905,961 A | 5/1999 | Sanders, III et al. |
| 5,949,785 A | 9/1999 | Beasley |
| 6,026,368 A | 2/2000 | Brown et al. |
| 6,029,205 A * | 2/2000 | Alferness et al. |
| 6,115,734 A | 9/2000 | Mansion |
| 6,188,699 B1 * | 2/2001 | Lang et al. |

* cited by examiner

Primary Examiner—William Luther
(74) Attorney, Agent, or Firm—Scully, Scott, Murphy & Presser

(57) ABSTRACT

In a router comprising one or more network processing (NP) devices for routing data packets from a source NP device to a destination device via a switch fabric, with each network processing device supporting a number of interface ports, each port capable of interfacing with one or more data queues for receiving packets associated with a class-of-service characterizing the routing of the packets, a system and method for routing packets comprising: classifying a packet to be forwarded from a source NP device according to a particular class-of-service and determining outgoing interface port information of a destination NP device to forward the packet, the interface port having a pre-defined queue base address associated therewith; encoding a queue index offset for the packet associated with a particular class-of-service associated with the packet to be routed; forwarding the packet, queue index offset and outgoing interface port information to the destination NP; and, determining a queue identifier from the base address and transmitted queue index offset for indicating a particular queue by which the classified packet is to be forwarded, wherein the queue identifier is determined locally at the destination NP device forwarding the packet.

15 Claims, 1 Drawing Sheet

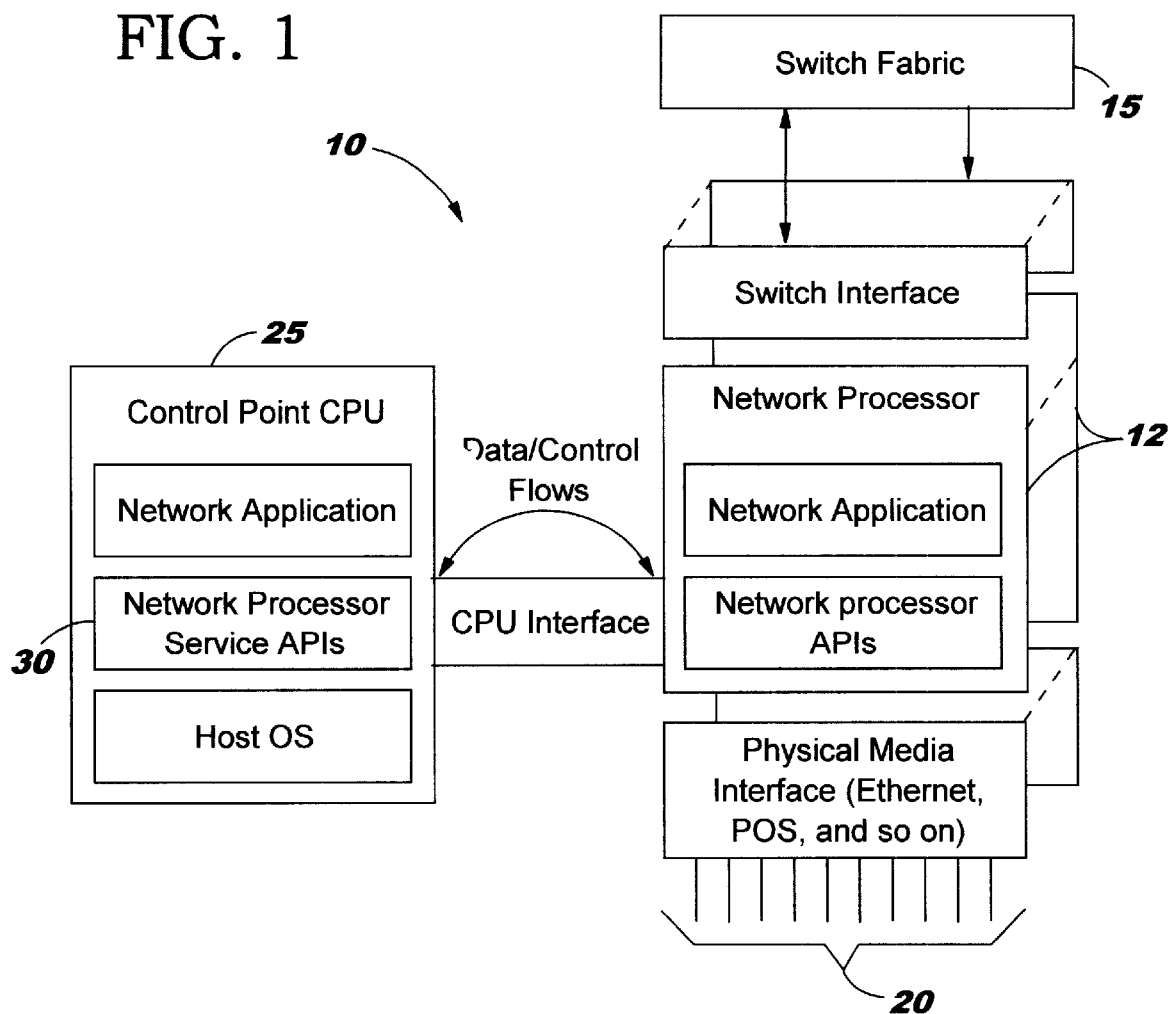
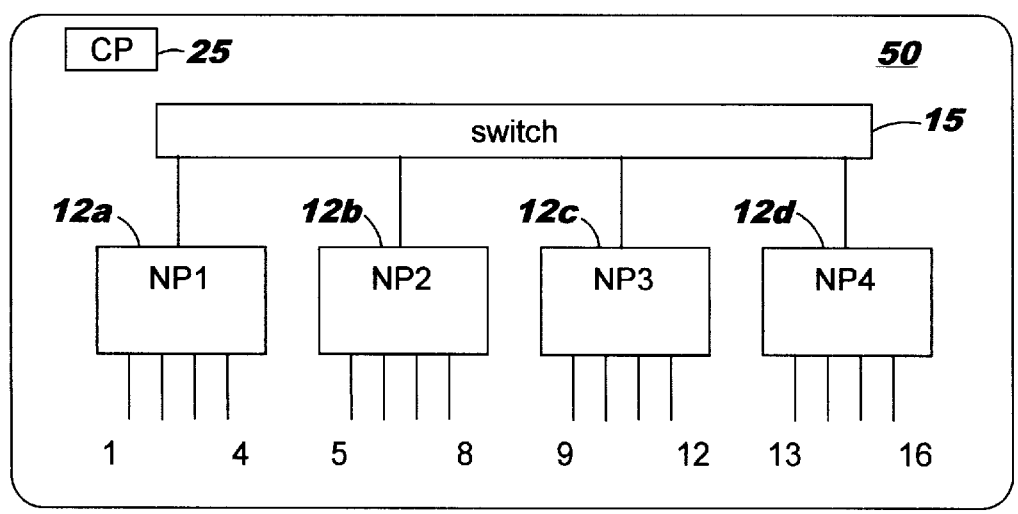

SCALEABLE AND ROBUST SOLUTION FOR REDUCING COMPLEXITY OF RESOURCE IDENTIFIER DISTRIBUTION IN A LARGE NETWORK PROCESSOR-BASED SYSTEM

BACKGROUND OF THE INVENTION

1. Field of the Invention

This invention relates generally to network processor-based devices, and more specifically to an improved system and method for reducing the complexity of resource identifier distribution in a large network processor-based system.

2. Discussion of the Prior Art

In today's networked world, bandwidth is a critical resource. Increasing network traffic, driven by the Internet and other emerging applications, is straining the capacity of network infrastructures. To keep pace, organizations are looking for better technologies and methodologies to support and manage traffic growth and the convergence of voice with data.

The convergence of voice and data will play a large role in defining tomorrow's network environment. Currently, the transmission of data over Internet protocol (IP) networks is free. Because voice communications will naturally follow the path of lowest cost, voice will inevitably converge with data. Technologies such as Voice over IP (VoIP), Voice over ATM (VoATM), and Voice over Frame Relay (VoFR) are cost-effective alternatives in this changing market. However, to make migration to these technologies possible, the industry has to ensure quality of service (QoS) for voice and determine how to charge for voice transfer over data lines.

Integrating legacy systems is also a crucial concern for organizations as new products and capabilities become available. To preserve their investments in existing equipment and software, organizations demand solutions that allow them to migrate to new technologies without disrupting their current operations.

Eliminating network bottlenecks continues to be a top priority for service providers. Routers are often the source of these bottlenecks. However, network congestion in general is often misdiagnosed as a bandwidth problem and is addressed by seeking higher-bandwidth solutions. Today, manufacturers are recognizing this difficulty. They are turning to network processor technologies to manage bandwidth resources more efficiently and to provide the advanced data services, at wire speed, that are commonly found in routers and network application servers. These services include load balancing, QoS, gateways, fire walls, security, and web caching.

For remote access applications, performance, bandwidth-on-demand, security, and authentication rank as top priorities. The demand for integration of QoS and CoS, integrated voice handling, and more sophisticated security solutions will also shape the designs of future remote access network switches. Further, remote access will have to accommodate an increasing number of physical mediums, such as ISDN, T1, E1, OC-3 through OC-48, cable, and xDSL modems.

A network processor (herein also mentioned as an "NP") has been defined as a programmable communications integrated circuit capable of performing one or more of the following functions:

Packet classification—identifying a packet based on known characteristics, such as address or protocol;

Packet modification—modifying the packet to comply with IP, ATM, or other protocols (for example, updating the time-to-live field in the header for IP);

Queue/policy management—reflects the design strategy for packet queuing, de-queuing, and scheduling of packets for specific applications; and, Packet forwarding—transmission and receipt of data over the switch fabric and forwarding or routing the packet to the appropriate address.

For exemplary purposes, reference is made to FIG. 1 which illustrates a logical model of a generic Network Processor system 10. As shown in FIG. 1, multiple Network Processors (NP) 12 are shown connected using a switch fabric 15, with each of the network processors supporting a large number of external LAN or WAN interface ports 20. A separate General Purpose Processor (GPP) functions as a control point (CP) 25 for the system and has a physical or logical association with all of the Network Processors 12 in the system for enabling the customization and configuration of the Network Processor (NP) devices so that they may handle the forwarding of data packets and frames. It should be understood however, that the GPP may be embedded in a network processor device itself. The generic network processor system 10 comprises two major software components: 1) the control point code base running on the GPP, and, the programmable hardware-assist processors' picocode in each of the network processors. These two software components are responsible for initializing the system, maintaining the forwarding paths, and managing the system. From a software view, the system is distributed. The GPP and each picoprocessor run in parallel, with the CP communicating with each picoprocessor using a predefined application program interface (API) 30 and control protocol.

The CP code base provides support for the Layer 2 and Layer 3 topology protocols and Layer 4 and Layer 5 network applications and systems management. Examples are protocol support for VLAN, IP, Multiprotocol Label Switching standard (MPLS) and equal-cost multipath (ECMP), and the supporting address- and route-learning algorithms to maintain topology information.

With particular reference to FIG. 1, and accompanying description found in commonly-owned, co-pending U.S. patent application Ser. No. 09/384,691 filed Aug. 27, 1999 and entitled "NETWORK PROCESSOR PROCESSING COMPLEX AND METHODS", the whole contents and disclosure of which is incorporated by reference as if fully set forth herein, the general flow of a packet or frame received at the NP device is as follows: frames received from an network connection, e.g., Ethernet MAC, are placed in internal data store buffers by an upside "enqueue" device (EDS-UP) where they are identified as either normal data frames or system control frames (Guided Frames). In the context of the invention, frames identified as normal data frames are enqueued to an Embedded Processor Complex (EPC) which comprises a plurality of picoprocessors, e.g., protocol processors. These picoprocessors execute logic (picocode) capable of looking at the received frame header and deciding what to do with the frame (forward, modify, filter, etc.). The EPC has access to several lookup tables, and classification hardware assists to allow the picoprocessors to keep up with the high-bandwidth requirements of the Network Processor. A classification hardware assist device in particular, is provided for classifying frames of well known frame formats. The Embedded Processing Complex (EPC) particularly provides and controls the programmability of the NP device and includes, among other components (such as memory, dispatcher, interfaces), N processing units, referred to as GxH, which concurrently execute picocode that is stored in a common instruction memory. It is understood, however, that the architecture and structure is completely scalable towards more GxHs with the only limitation being the amount of silicon area provided in the chip. In operation, classification results from the classification hardware assist device are passed to the GxH, during frame dispatch. Each GxH preferably includes a Processing Unit core (CLP) which comprises, e.g., a 3-stage pipeline, general purpose registers and an ALU. Several GxHs in particular, are defined as General Data Handlers (GDH) each of which comprise a full CLP with the five coprocessors and are primarily used for forwarding frames. One GxH coprocessor, in particular, a Tree Search Engine Coprocessor (TSE) functions to access all tables, counters, and other data in a control memory that are needed by the picocode in performing tree searches used in forwarding data packets, thus freeing a protocol processor to continue execution. The TSE is particularly implemented for storing and retrieving information in various processing contexts, e.g., determining frame handling rules for routing, QoS treatment, lookup of frame forwarding information and, in some cases, frame alteration information.

Traditional frame routing capability provided in network processor devices typically utilize a network routing table having entries which provide a single next hop for each table entry. As known, in current Internet (network) packet routing protocols there may be implemented Internet Protocol (IP) Differentiated Services (DiffServ) which define a type of packet communication service. The Internet Engineering Task Force (IETF) standards that define these service may be found in the following references: a) An Architecture for Differentiated Services (RFC2475); b) An Expedited Forwarding PHB (RFC2598); and c) Assured Forwarding PHB Group (RFC2597) and, on-line, at *http://www.ietf.org/html.charters/diffserv-charter.html*. For example, Best Effort (BE) is the best-effort class of service such as what is generally available in the Internet today whereby all traffic flows get the same default treatment; the Expedited Forwarding (FE) is expedited forwarding, which is a premium class-of-service with strict QoS guarantees on latency and jitter, etc. There is no fixed set of DiffServ classes, however, the class-of-service information is conveyed in each packet header by encoding the DiffServ Code Point DSCP which is six (6) bits for defining up to 64 classes. The meaning of each class is defined by the service provider. There are recommended values for certain classes of service for interoperability, for example, BE, EF and Assured Forwarding (AF) have recommended encoding values.

Currently, in an example system with 64 NP devices that implements IP Differentiated Services (DiffServ) with each NP supporting 40 fast Ethernet ports, for example, in order to support the standard DiffServ service classes, at least six flow queues corresponding to six classes-of-service need to be defined on each port. This requires a total of about 64×40×6 (i.e., 15,360) queue identifiers (QIDs) that need to be specified in the packet forwarding data structures which adds to the complexity of the system. It is understood that, a "queue" may be associated with a "flow" which may be a port, or a neighboring device in case the port is connected to a shared medium such as an Ethernet LAN or a (MultiProtocol Label Switching) MPLS network tunnel, etc.

Considering an IP router 50 implemented with four Network Processors (NP) 12a–12d as shown in FIG. 2, and assuming that each NP device supports four OC-48 interfaces for a total of 16 ports on the router, in order to support IP Differentiated Services with say four classes-of-service per port, the networking software running on the Control Point (CP) 25 must create four queues on each port so that each queue is dedicated to a class-of-service. This results in a total of 16*4=64 queues on the router each identified via a queue identifier (queue control memory block memory address). Normally, these QIDs need to be distributed to every NP device so that packets can be routed to the appropriate queue. The distribution of such large number of queue identifiers among the NPs adds to the overhead of control traffic within the router device.

It would thus be highly desirable to provide a system and method that overcomes the scalability problem by obviating the need to distribute queue id information to every source NP in a large distributed NP system (router).

It would thus be highly desirable to provide a system and method that overcomes the scalability problem by enabling the specification of mechanisms that enable an application to manage queues in smaller block increments, e.g., units of six.

It would thus be highly desirable to provide a system and method that enables routing decisions to be made by egress network processor devices that provide the interface ports via which packets having class service definitions are communicated.

SUMMARY OF THE INVENTION

Accordingly, it is an object of the present invention to provide in a network processing (NP) system implementing a plurality of NP devices, with each NP device including a plurality of interface ports, each port having associated one or more queues associated therewith, and wherein the NP system is enabled to provide IP Differentiated Service classes pertaining to packets to be communicated, a system and mechanism that overcomes the scalability problem by enabling an application to manage queues associated with ports of in smaller block increments.

It is a further object of the present invention to provide in a network processing (NP) system providing IP Differentiated Service classes pertaining to packets to be communicated, a system and mechanism for enabling an application to manage queues associated with interface ports of NP devices in blocks of six.

It is another object of the present invention to provide in a network processing (NP) environment, a system and method that enables queuing decisions to be made by egress network processor devices that provide the interface ports via which packets communicated in accordance with class service definitions are communicated. According to the principles of the invention, there is provided a router and routing methodology, wherein the router comprises one or more network processing (NP) devices for routing data packets from a source NP device to a destination device via a switch fabric, with each network processing device supporting a number of interface ports, each port capable of interfacing with one or more data queues for receiving packets associated with a class-of-service characterizing the forwarding treatment of the packets. The routing methodology comprises: classifying a packet to be forwarded from a source NP device according to a particular class-of-service and determining outgoing interface port information of a destination NP device to forward the packet, the interface port having a pre-defined queue base address associated therewith; encoding a queue index offset for the packet associated with a particular class-of-service associated with the packet to be routed; forwarding the packet, queue index offset and outgoing interface port information to the destination NP; and, determining a queue identifier from the base address and transmitted queue index offset for indicating a particular queue by which the classified packet is to be forwarded.

Advantageously, the queue identifier is determined locally at the destination NP device forwarding the packet, thus obviating the need for queue identifiers to be distributed throughout the network for packet routing purposes.

BRIEF DESCRIPTION OF THE DRAWINGS

Further features, aspects and advantages of the apparatus and methods of the present invention will become better understood with regard to the following description, appended claims, and accompanying drawings where:

FIG. 1 illustrates a logical model of a generic Network Processor system 10.

FIG. 2 illustrates an example router device 50 implementing four network processor (NP) blades each with associated interface ports.

DETAILED DESCRIPTION OF THE PREFERRED EMBODIMENT

The present invention is a mechanism that enables the identification of a single block per network processor (NP) port when routing packets classified in accordance with DiffServ classes to egress NP ports and associated queues in a large distributed network processing system. This solution enables the efficiency of not having to distribute identifying information regarding every NP device port and queue to every source NP in a large distributed router in order to route the network packets.

More particularly, the mechanisms overcome the scalability problem by enabling the network application to manage several queues together as a block entity, e.g., one queue per port per DiffServ service class. For instance, the network application may allocate a block of six contiguous queues where each block is assigned a queue base identifier (QBASE) that refers to the lowest numbered queue in the block. The other queues in the block are identified using a pre-defined index or offset (QUEUE INDEX). For example, the index for the queue supporting Expedited Forwarding (EF) DiffServ service class may be assigned a value of b'0101'. Similarly, the index assigned for the queue supporting Best Effort (BE) service class may be b'0000'. Preferably, the QUEUE BASE identifier is stored only in the forwarding data structure of the NP to which the target port of the queue is attached. This avoids the need of having to completely distribute every queue identifier among all of the NPs. When a packet enters the system, the QUEUE INDEX is assigned on the source NP as part of the DiffServ packet classification and forwarding process. The queue index is passed in the NP frame header to the target NP. The packet forwarding component on the target NP fetches the queue base from its forwarding tables. For example, the IP routing protocol fetches the queue base address QBASE from the ARP entry for Ethernet ports or from the port configuration for point-to-point links. The QUEUE INDEX from the frame header is added to the queue base to derive the queue identifier to which the packet is enqueued, i.e.,

QBASE+QUEUE INDEX=QUEUE IDENTIFIER.

As IP Differentiated Services may can be supported in an MPLS (MultiProtocol Label Switching) network (see for instance, MPLS Support of Differentiated Services (draft-ietf-mpls-diff-ext-08.txt), skilled artisans will be able to apply the mechanism of the invention for DiffServ-over-MPLS whereby the queue base is fetched from the MPLS out-segment entry on the target NP.

Thus, for the example router device 50 having four NP blades 12a–12d such as shown in FIG. 2, when a packet is received on interface labeled "1", the NP1 device 12a may determine that this packet is to be sent out on interface labeled "12" for a class-of-service type "4". According to current methods, the NP1 device 12a would enqueue the packet to the switch 15 with an indication that this packet must be sent to NP3 and placed in QID=48 so that the packet is placed in the queue assigned to class-of-service 4 queue on port 12. According to the invention, however, as the QIDs need no longer be distributed, QID=48 is not known in the NP1 device 12a; it is only known in NP3 12c where the actual queue object (queue control block address) resides. The sequence of steps thus performed by the router 50 as the packet transits the router are now described according to the invention as follows:

1) The NP1 device 12a performs classification function to determine the outgoing port and the class-of-service to be accorded to the packet. The classification could be based on the DiffServ code point (DSCP) encoded in a type-of-service octet and the destination IP address;

2) The NP1 device 12a then determines the outgoing interface, e.g., port 12 according to the example device of FIG. 2, which is on device NP3 12c.

3) The NP1 device 12a encodes the class-of-service information conveyed by the DSCP to the internal queue index value. This DSCP-to-queue index mapping is statically defined at all NP blades by the CP software managing the router/network resources so there is no overhead of QID distribution.

4) The NP1 device 12a then enqueues the packet to the switch with the indication that it must be sent to NP3, and use queue index=4 on port 12.

5) The NP3 device 12c receives the packet from the switch along with the indication about the queue index and outgoing port.

6) The NP3 device 12c obtains the Qbase value associated with port 12 which is a value assigned by the CP software when it creates class-of-service queue control blocks on each port. For example, port 12 could be assigned a Qbase value of 45 so that the four classes-of-service queues for port 12 are identified by QIDs 45 to 48.

7) The NP3 device then determines the QID locally using the above mentioned transform: QID=Qbase+queue index.

For example, the queue index for class-of-service 4 may be a value of 3, i.e., QID=45+3=48.

8) Finally, the NP3 device 12c places the packet in the appropriate queue on port 12 (QID=48).

It should be understood that, while the invention as described herein associates a "queue"with a NP device "port", it should be understood that, according to the principles of the present invention, a "queue" may be associated with a "flow" which may be a port, or a neighboring device, e.g., in case the port is connected to a shared medium such as an Ethernet LAN or a (MultiProtocol Label Switching) MPLS network tunnel, etc. Thus, it is intended that the principles of the invention be applicable for identifying structures of finer granularity.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. In a router comprising one or more network processing (NP) devices for routing data packets from a source NP device to a destination device via a switch fabric, with each network processing device supporting a number of interface ports, each port capable of interfacing with one or more data queues for receiving packets associated with a class-of-service characterizing said routing of said packets, a method for routing packets comprising:
   a) classifying a packet to be forwarded from a source NP device according to a particular class-of-service and determining outgoing interface port information of a destination NP device to forward said packet, said interface port having a pre-defined queue base address associated therewith;
   b) encoding a queue index offset for said packet associated with a particular class-of-service associated with said packet to be routed;
   c) forwarding said packet, queue index offset and outgoing interface port information to said destination NP; and,
   d) determining a queue identifier from said base address and transmitted queue index offset for indicating a particular queue by which said classified packet is to be forwarded, wherein said queue identifier being determined locally at the destination NP device forwarding the packet.

2. The method in accordance with claim 1, further including the step e) of placing the forwarded packet in the particular queue corresponding to said calculated queue identifier.

3. The method in accordance with claim 1, further including the step of implementing a control mechanism for assigning one or more class-of-service queue control blocks for each interface port.

4. The method in accordance with claim 1, further including, prior to step a), the step of assigning a queue base address to each interface port supported by NP devices in said router.

5. The method in accordance with claim 1, wherein said encoding step b) includes the step of mapping class-of-service information conveyed by a control mechanism to a queue index.

6. The method in accordance with claim 1, wherein said forwarding step c) includes the step of enqueuing the packet to a switch in said switch fabric prior to forwarding it to said destination NP with said queue index offset and interface port information.

7. A router comprising one or more network processing (NP) devices for routing data packets from a source NP device to a destination device via a switch fabric, each network processing device including a means capable of interfacing with one or more data queues, each data queue associated with a packet flow for receiving packets associated with a class-of-service characterizing treatment of packets comprising said packet flow, said router comprising:
   device located at a source NP device for classifying a packet to be routed according to a particular class-of-service, and determining outgoing interface information of a destination NP device handling said packet flow, one of said destination NP device interface means or packet flow having a pre-defined queue base address associated therewith;
   device for encoding a queue index offset for said packet according to a particular class-of-service characterizing said packet flow;
   forwarding mechanism for transmitting said packet, queue index offset and outgoing interface information to said destination NP; and,
   mechanism for determining a queue identifier from said queue base address and transmitted queue index offset, said queue identifier for indicating a particular queue to receive said classified packet, wherein said queue identifier is determined locally at the destination NP device forwarding the packet.

8. The router as claimed in claim 7, wherein an interface means supported at said destination NP device includes a port device.

9. The router as claimed in claim 7, wherein said forwarding mechanism further places the forwarded packet in the particular queue corresponding to said determined queue identifier.

10. The router as claimed in claim 8, further including a control device for assigning one or more class-of-service queue control blocks corresponding to a port device.

11. The router as claimed in claim 10, wherein said control device further assigns said queue base address to each port device supported by NP devices in said router.

12. The router as claimed in claim 7, wherein said encoding device performs a mapping of class-of-service information conveyed by said control device to a queue index.

13. The router as claimed in claim 7, wherein said forwarding mechanism further enqueues the packet to a switch in said switch fabric prior to forwarding it to said destination NP with said queue index offset and outgoing interface information.

14. In a router comprising one or more network processing (NP) devices for routing data packets from a source NP device to a destination device via a switch fabric, with each network processing device including a means capable of interfacing with one or more data queues, each DATA QUEUE with a packet flow for receiving packets associated with a class-of-service characterizing treatment of packets comprising said packet flow, a method for routing packets comprising:
   a) classifying a packet to be forwarded from a source NP device according to a particular packet flow and determining outgoing interface information of a destination NP device handling said packet flow, one of said destination NP device interface means or packet flow having a pre-defined queue base address associated therewith;
   b) encoding a queue index offset for said packet according to a particular class-of-service characterizing said packet flow;
   c) forwarding said packet, queue index offset and outgoing interface information to said destination NP; and,
   d) determining a queue identifier from said base address and transmitted queue index offset for indicating a particular queue to receive said classified packet, wherein said queue identifier is determined locally at the destination NP device forwarding the packet.

15. The method as claimed in claim 14, wherein an interface means supported at said destination NP device includes a port device.

* * * * *